Inventor
Arthur F. Anderson

Fig. 8

Inventor
Arthur F. Anderson
By
Gary, Parker, Juettner & Cullinan
Attys

Inventor
Arthur F. Anderson
By
Gary, Parker, Juettner & Cullinan
Att'ys

United States Patent Office 3,391,753
Patented July 9, 1968

3,391,753
FLUID POWER WHEEL
Arthur F. Anderson, Elmhurst, Ill., assignor, by mesne assignments, to Ulrich Hydraulics, Inc., Roanoke, Ill., a corporation of Delaware
Filed Oct. 27, 1965, Ser. No. 505,346
17 Claims. (Cl. 180—66)

ABSTRACT OF THE DISCLOSURE

Fluid pressure operated equipment, particularly a self contained fluid pressure powered wheel for vehicles, including an improved fluid pressure operated motor for driving the wheel, an improved fluid supply and control system for the motor and an especially compact drive assembly confined entirely within the wheel rim and characterized by a motor including a rotary cylinder block having the drive gear directly on the periphery thereof.

---

The fluid powered wheel of the invention is suited for a variety of uses in the propelling of vehicles and like purposes, and may be utilized singly or in multiple as the sole propelling means for a vehicle or as assistive or special purpose propulsion means for a vehicle. For example, I have utilized a single wheel as the sole propulsion means for tricycle type vehicles such as golf carts and small tractors, preferably as the front steering wheel thereof, and have utilized a pair of the wheels as the front wheels of conventional tractors, motor graders and the like providing front wheel assist to the customary rear wheel drives. Manifestly, the wheel may also be utilized for providing a four wheel drive vehicle.

In order to acquaint those skilled in the art with the manner of making and using my improved wheel, motor and control system, I shall describe, in connection with the accompanying drawings, the best mode contemplated by me for carrying out the invention.

Figures 1, 4:
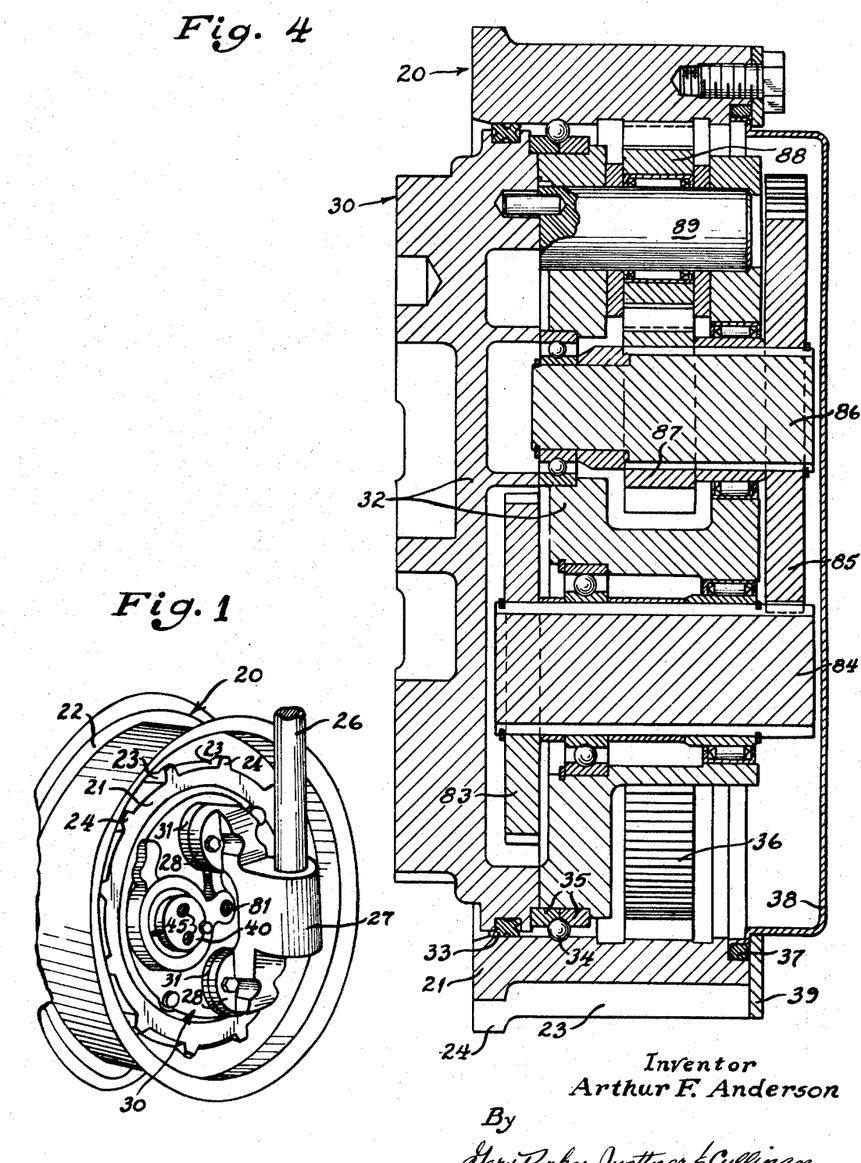
FIGURE 1 is a perspective view of the wheel illustrating the inner surface thereof and one form of mounting means therefor.
FIGURE 4 is a vertical section of the wheel taken substantially on line 4—4 of FIGURE 3.
Figures 2, 5:
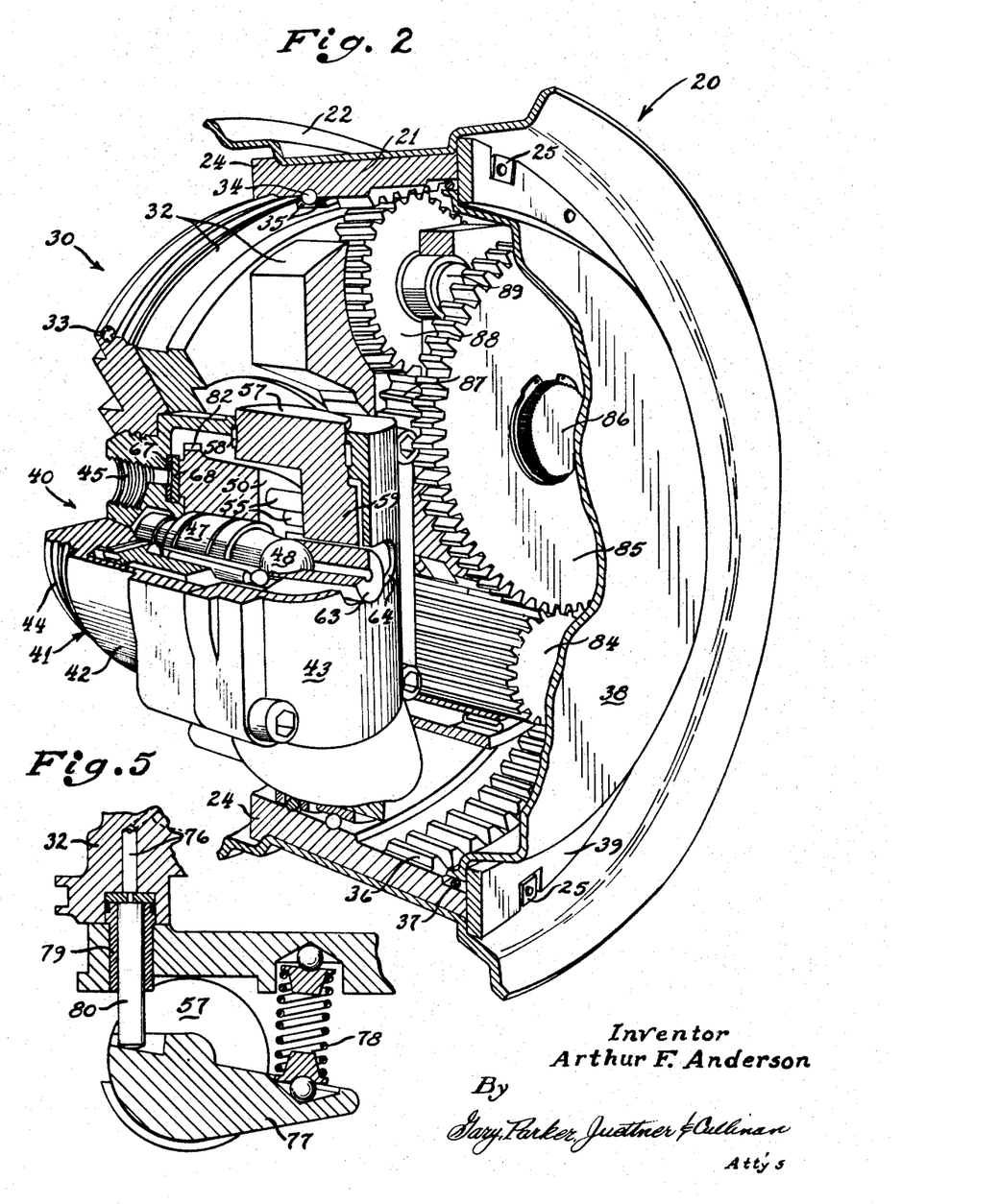
FIGURE 2 is an enlarged perspective view of the wheel with portions thereof cut and broken away to reveal the inner workings of the wheel.
FIGURE 5 is a fragmentary sectional view of the governor for the wheel motor, the view being taken substantially on line 5—5 of FIGURE 3.
Figure 3:
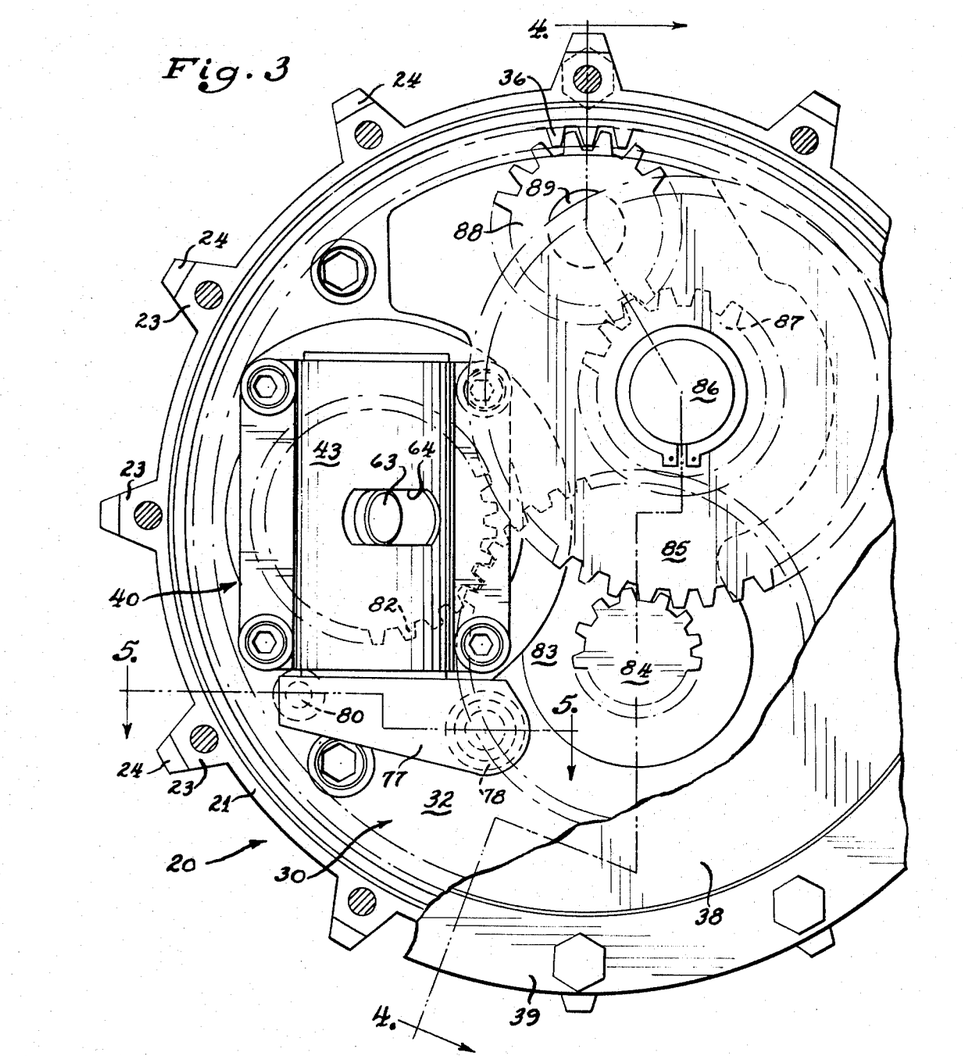
FIGURE 3 is a side elevation of the wheel from the outer surface thereof with the wheel rim removed, portions of the hubcap being broken away to reveal the interior of the wheel.

Referring to FIGURES 1 and 2, the wheel of the present invention is entirely self contained and comprises a rim 20 and a cylindrical plug assembly 30 inserted in and confined substantially entirely within the rim. The rim 20 comprises an inner tubular element 21 suitably a hollow cylindrical casting or forging and a conventional vehicle tire rim 22 secured on the tubular element for reception of a tire. To mount the tire rim 22 on the element 21 the latter is provided on its outer surface with circumferentially spaced ribs 23 which taper outwardly from one end face to the other and terminate in a flange or abutment 24. The tire rim 22 is wedged onto the tapered ribs and into engagement with the abutments and is secured against displacement by lugs 25 bolted to selected ones of the ribs 23 at the face thereof opposite the abutments 24.

An important feature of the invention is the fact that the plug assembly 30 is located substantially entirely within the confines of a conventional tire rim 22. Extra wide or high flotation tires are not required to obtain this advantage. It is obtained by virtue of the compactness of the plug assembly and is applicable in respect of substantially all standard tire sizes. As an initial endeavor, the invention has been used to provide front wheel assist for farm and industrial tractors and motor graders. The front tires of such tractors are usually of twelve, sixteen or twenty inch diameter, and I have devised power wheels for each of these standard sizes each having the advantages enumerated and the advantages to be described.

Since the wheels are entirely self contained, the same may be mounted on any standard wheel mounting without interfering with or obstructing the wheel mount or suspension means and the advantages thereof, such as particular capabilities for steering, inclining the wheels, adjusting the spacing between the wheels, etc. In FIGURE 1 I have illustrated by way of example the association of my wheel with a spindle or kingpin 26 for mounting the wheel on a tractor having a spindle style of front wheel mount. The spindle 26 is secured to a wishbone 27 which is bolted by means of pads 28 at its ends to complemental mounting pads 31 formed on the inside face of the plug 30. The plug assembly 30 is thus mounted on the vehicle and the rim 20 is free to rotate to drive the vehicle.

The plug assembly 30 comprises a cylinder 32 mounted within the rim 20 adjacent the inside face thereof and constituting the journal for the rim, the support for the remaining components of the assembly 30 and the member that is connected to and mounted on the vehicle; the pads 31 being formed integrally on the exposed face of the cylinder. The cylinder is preferably formed of two elements to facilitate assembly of the wheel, the two elements being bolted together during the assembly. The element at the inside face of the wheel has a cylindrical imperforate periphery, and an annular groove is formed therein for reception of a sealing ring 33 establishing a first end seal between the rim and the plug.

Inwardly of the seal 33, the rim element 21 is provided with an internal annular groove forming a bearing race. Radially opposed to said groove is a complemental race formed on the periphery of the cylinder 32, the two races being adapted for reception of an annular series of bearing balls 34 which serve the two-fold function of journaling the rim on the cylinder and connecting the rim to the cylinder against axial displacement. Preferably, the race on the cylinder is formed by a pair of rings 35 to facilitate assembly of the bearing balls in the races.

At approximately the mid point thereof, inwardly of both the seal 33 and the bearing 34, the rim element 22 is provided with an internal ring gear 36 which may be cast integrally with the element. Meshed with this gear is a rim driving train to be described. At the outer face thereof, the rim element is provided with a counterbore for reception of the second sealing ring 37. Slipped into the rim in sealed engagement with the ring 37 is a circular cover plate or hub cap 38 for the wheel, said cap being secured in sealed relation to the rim by an annular ring 39 which engages the cap and the outer face of the element 22 and is secured to the latter by bolts extending through the ring into the ribs 23. To accommodate the tire rim locking lugs 25, the ring 39 is suitably notched at spaced locations as shown in FIGURE 2.

Figure 6:
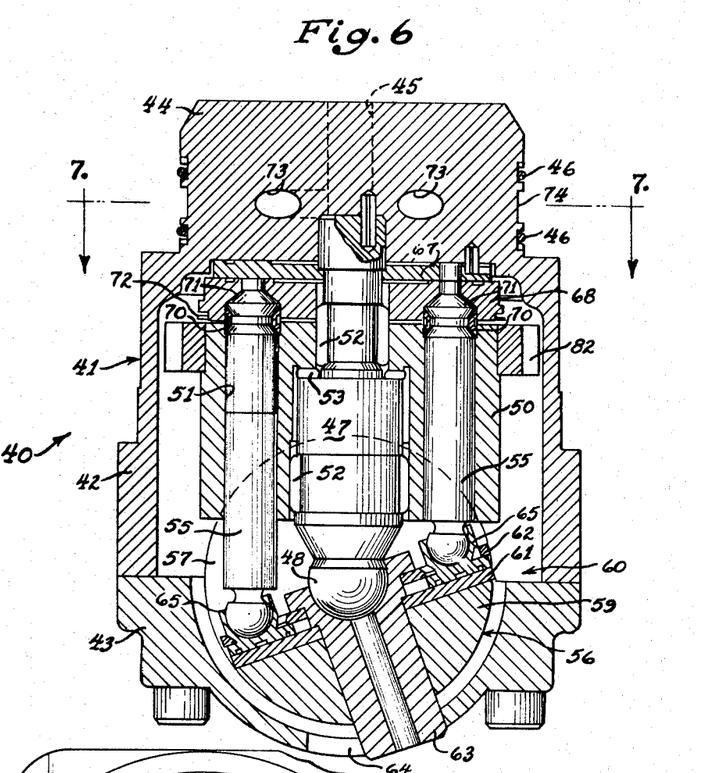
FIGURE 6 is a horizontal longitudinal section on an enlarged scale of the motor for the wheel.

Mounted on and extending through the cylinder 32 into the interior of the rim is a fluid pressure operated motor 40 which is illustrated in detail in FIGURES 2 and 6. The motor comprises a housing 41 formed of a cup-shaped main member 42 and a cap 43 bolted or otherwise secured to the open end of the main member. At the end thereof opposite the cap, the housing includes a reduced cylindrical end portion 44 fitting within a complemental bore in the cylinder 32, by means of which the motor is mounted on the cylinder. The end portion 44 extends to the exposed end face of the cylinder 32 and is provided thereat with a pair of fluid supply ports 45 (see FIGURE 1) by means of which operating fluid is supplied to and returned from the motor. To seal the motor to the cylinder, the portion 44 is provided on its peripheral surface with a pair of axially spaced sealing rings 46.

Anchored against rotation in the housing is an axially extending guide shaft 47 having journal surfaces along its length and a spherical end portion 48 the center of which is coincident with the plane of the juncture between the cup member 42 and the cap 43. Journalled concentrically on the shaft 47 within the cap member 42 is a cylinder block 50 having a circular array of axially extending cylindrical bores therein. The bores 51 are preferably nine in number and located at equal circumferential spacings. In the preferred structure, the block is journalled on the shaft by two sets of needle bearings 52 and a set of needle thrust bearings 53.

Each of the cylinders 51 reciprocably mounts therein a piston 55, the reciprocal movements of which are guided and governed by a tilt box, indicated generally at 56. The tilt box comprises a pair of laterally extending trunnions 57 which are journalled in circular bearings 58 formed in opposed side walls of the housing by semicircular mating recesses in the cup member 42 and the cap 43, whereby the trunnions are journalled on an axis coincident with the center of the spherical head 48 of the shaft 47. Bridging between the trunnions in axially spaced relation to the head 48 is a carrier portion 59 mounting thereon a bearing assembly 60.

The assembly 60 includes an annular wear plate 61, an annular shoe plate 62 and a socket stem 63 extending through the two plates and the carrier 59 to retain the plates assembled to the carrier. The member 63 includes a socket portion engaging the spherical shaft head 48, and thus pivotally mounted thereon, and a stem portion extending through the two plates and carrier, and also preferably extending through a slot or comparable opening 64 in the cap end of the housing 41. The trunnions 57 and the socket 63 thus mount the tilt box for pivotal movement about the axis of the trunnions, and the stem portion of the member 63 extending through the housing limits the arc of such pivotal or tilting movement. Preferably, the opening in the housing is such relative to the stem as to accommodate movement of the tilt box from an end position wherein the plates 61 and 62 are perpendicular to the shaft 47 to a position wherein the plates are transverse to, but tilted with respect to, the shaft and the pistons.

Each of the pistons 55 is provided at the end thereof outwardly of the cylinder with a spherical head and a bearing shoe 65 is universally mounted thereon. The shoes 65 in turn are trapped within, but have limited freedom for movement within, respective apertures in the shoe plate 62. The ends of the shoes are flat to engage flush against the wear plate 61, and recesses are preferably formed in said flat ends to receive a lubricant for reducing wear between the shoes and the plate 61. In use, the cylinder block, the pistons, the shoes and the shoe plate rotate relative to the wear plate and the remainder of the tilt box. With the box tilted relative to the shaft, the pistons of necessity reciprocate in their cylinders as the block rotates. With the tilt box perpendicular to the shaft, the pistons cannot reciprocate and the motor is quiescent. Tilting of the box of course varies the stroke of the pistons, and thus the displacement of the motor, between zero when it is perpendicular to the shaft up to the maximum predetermined by the slot or opening 64 in the housing.

Figure 7:
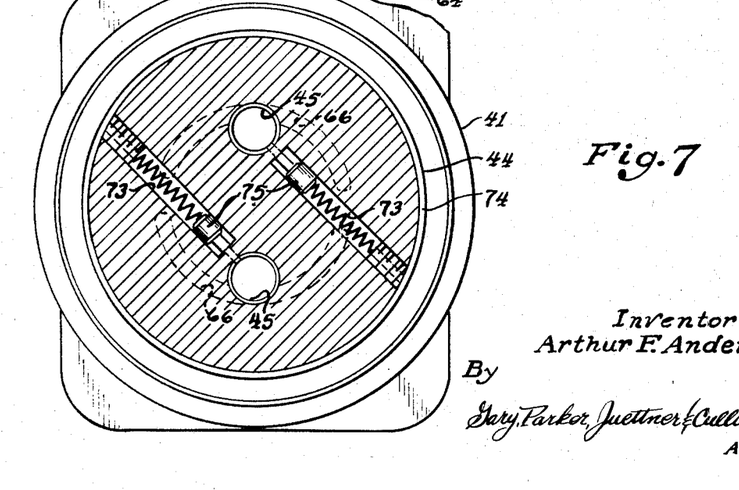
FIGURE 7 is a cross-sectional view of the fluid supply portion of the motor, the view being taken substantially on line 7—7 of FIGURE 6.

To drive the motor, fluid under pressure is admitted to one or the other of the ports 45. As shown in FIGURE 7, each port 45 communicates with an arcuate slot 66 subtending an arc of something less than 180 degrees from a position approximately in line with the low point to a position approximately in line with the high point of the tilt box 56. The two slots extend in opposite directions from the low point and together comprise a circle (broken at the high and low points) coincident with the circle defined by the cylinders 51. In the preferred embodiment, these arcuate slots are formed in a separate valve plate 67 pinned against rotation in the housing with the slots communicating respectively with the ports 45. Upon admission of fluid under pressure to one of the slots 66, the pistons 55 then aligned with that slot are forced outwardly. At the same time, the other slot is vented or otherwise connected to a point of relatively low pressure in the fluid system, whereby the pistons then aligned therewith are free to move inwardly. As a consequence, the pistons forced outwardly by fluid pressure attempt to become fully distended from the cylinder and thus slide up the inclined ramp defined by the tilt box from the low point to the high point of the ramp in the direction determined by the direction in which the particular slot 66 extends from the low point of the box. This of necessity produces rotation of the cylinders and the cylinder block about the shaft 47. Just prior to reaching the high point of the tilt box, each cylinder is cut off from the pressurized supply, i.e., moves out of communication with the respective slots 66, and the following pistons thereupon take over drive of the block. After passing the tilt box high point, each cylinder is vented or relieved via the other slot 66 to permit the piston to move into the cylinder to the low point of the box, where upon the cycle is repeated.

Thus, the pistons are driven outwardly by the fluid under pressure and this in turn produces rotation of the cylinder block. To reverse the direction of block rotation, it is only necessary to reverse the direction of the fluid supply to the motor, i.e., to supply the pressure fluid to the other of the ports 45 and slots 66, and to vent or otherwise relieve the pressure on the first port 45 and slot 66. The block rotates freely due to the low friction mounting thereof provided by the needle bearings 52 and 53 and the wear plate 61 and shoes 65.

While the thrust bearing 53 reduces end play of the cylinder block, and the lost motion connections provided between the shoes 65 and the plate 62 tend to reduce lateral shifting and tilting of the cylinder block, complete elimination of such relative movements is not easily attained as a practical manner because of the tremendous forces involved, especially in a motor as here shown where the fluid pressures are intended to run up to 5000 p.s.i. The consequence of such relative movements in prior art structures has been loss of a proper sealed relationship between the valve plate or member 67 and the cylinder block 50, whereupon the motor would not function. This invention provides an economical and practical solution to the problem in the form of a port plate 68 which maintains an effective seal between the valve plate and the block despite relative axial shifting or tilting of the two.

In the illustrated embodiment, the port plate 68 is an annular disc inserted between the valve plate and the cylinder block and flexibly coupled to the block by tubular connectors 70. A connector 70 is slidably mounted at its opposite ends in each of the cylinders 51 in the block 50 and in a complemental aligned hole 71 in the plate 68. Each connector maintains a seal between the respective cylinder 51 and hole 71, acts to couple the plate to the block for conjoint rotation therewith, and yet accommodates relative axial tilting movement between the plate and the block. In their preferred embodiment as shown in FIGURE 6, the connectors 70 are simply short metallic tubes feathered to a thin edge at each end thereof, fluid pressure acting on said feathered edges to seal the tubes in both said cylinders and said holes. At the surface thereof adjacent the valve plate, the port plate 68 has an accurately formed face complemental to the opposed face of the plate 67 for formation of a hydrostatic seal between the two plates. A spring 72 such as a wave washer is confined between the block 50 and the plate 68, thereby to bias the plate 68 into sealed but rotary engagement with the plate 67. In this manner, the plate 68 remains sealed to both the plate 67 and the cylinders 51, but the block is free to move relative to the plates without loss of the necessary sealed relationships.

To control the motor in accordance with the supply of fluid under pressure thereto, an automatic pressure sensitive governor is preferably embodied in the motor. The governor is supplied with operating fluid via the check valve system illustrated in FIGURE 7. As shown, each port 45 has associated therewith a diagonal passage 73 extending to an annular groove 74 located in the periphery of the reduced portion 44 of the motor housing between the seals 46. Each passage 73 is equipped with an outwardly opening check valve 75, whereby fluid under pressure from the port 45 then serving as the inlet port will open the respective check valve 75, admit pressure fluid to the groove 74 and thus the other passage 73 behind the check valve therein to maintain such other check valve closed. The cylinder 32 is in turn provided with passageways 76 (FIGURE 5) leading from the groove 74 to the interior of the rim 20 adjacent one of the tilt box trunnions 57 of the motor 40. The respective tilt box trunnion includes a lever 77 having one end aligned with the passageways 76 and a second end associated with a spring assembly 78 which acts to bias the lever and thus the trunnion and the tilt box to zero-tilt position (i.e., perpendicular to the shaft 47). The passageways 76 terminate in a small cylinder 79 containing a piston 80 adapted to engage the one end of the lever 77 and rotate the tilt box to a tilted position. The degree of tilt will be proportional to the pressure of the fluids applied, irrespective of which port 45 is then serving as the inlet, whereby the displacement of the motor is progressively increased with increase in fluid pressure. Thus, the motor is automatically controlled by the pressure of the supplied fluid to assure optimum motor performance.

According to the present invention, the motor output member is comprised of the cylinder block 50, and to this end an output gear 82 is formed on and preferably integrally with the block. Moreover, the gear is formed directly on the periphery of the block and not on extension thereof, whereby the power output is taken at a point intermediate the length of the motor thereby contributing to the overall economy and compactness of the motor and the power wheel. An aperture or opening is formed in the wall of the motor housing 41 to permit access to the gear 82. This opening or aperture also serves to accommodate passage of fluids leaking past the motor pistons into the wheel rim 20 between the sealed cover plate 38 and the cylinder and rim seal 33 whereby both the motor housing and the rim become filled with fluid (at low pressure) which serves automatically to lubricate the entire motor and wheel. Such lubricant is suitably drained or returned to source via an outlet port 81 in the center of the cylinder 32.

To establish a driving relationship between the rotary block 50 of the motor 40 and the ring gear 36 of the rim 20, a gear train is provided within the wheel in the form preferably of a gear reduction of the order of about 25 to 1. The train is comprised of a gear 83 meshed with the gear 82 and fixed to a shaft 84 which is journalled in the cylinder 32. The shaft 84 is directly formed with teeth constituting a pinion and the pinion thus defined is meshed with the gear 85 which is secured to a shaft 86. A pinion 87 secured to the shaft 86 is in turn meshed with an idler 88 journalled on a fixed shaft 89, and the same idler 88 is meshed with the ring gear 36, whereby the motor 40 is connected to drive the ring gear and the rim in opposite directions.

Figure 8:
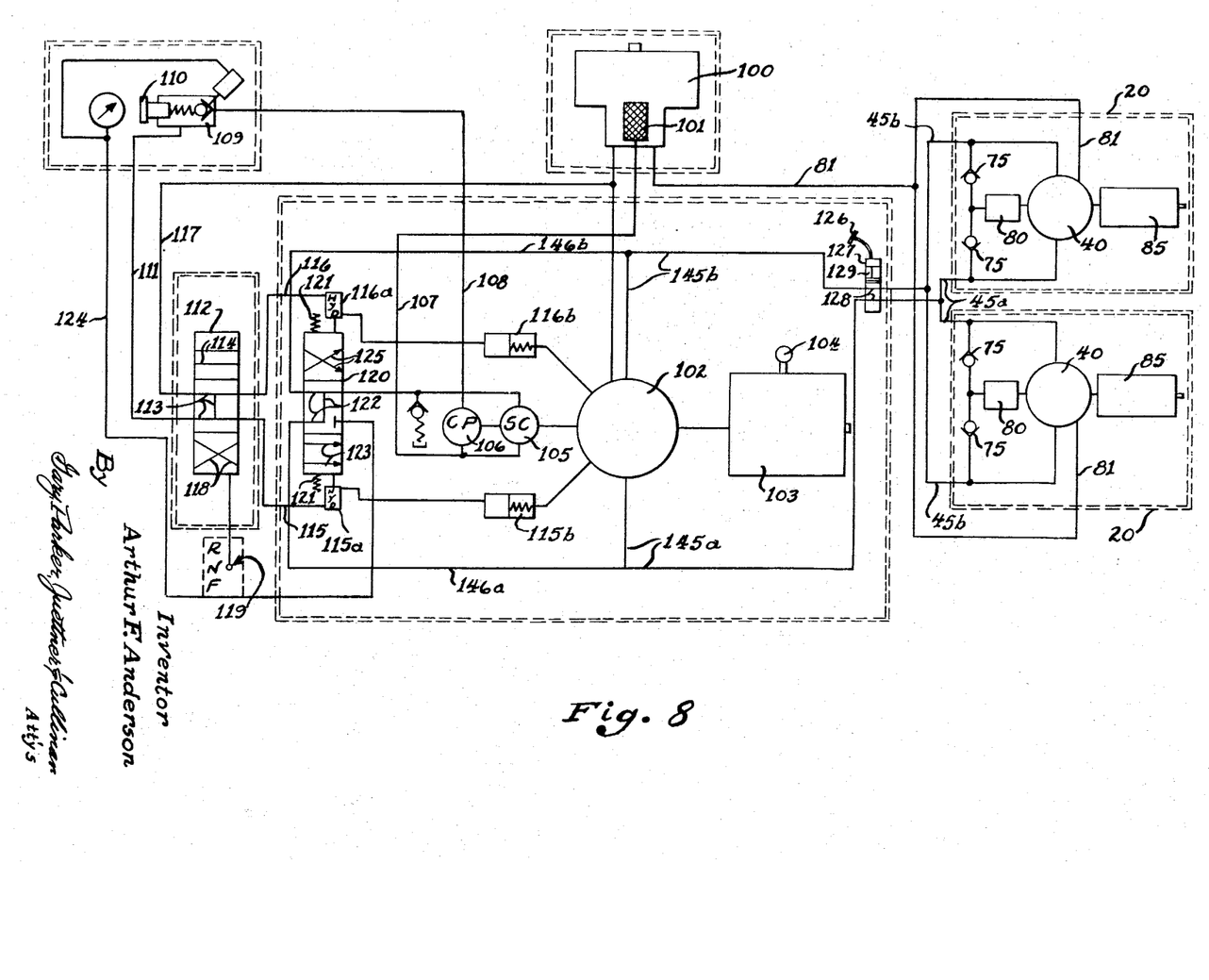
FIGURE 8 is a schematic circuit diagram of the pressure fluid supply and control system.

To supply the motor 40 with operating fluid, and to afford optimum control over operation of the wheel, the invention provides the control system illustrated in FIGURE 8 hereof. In such illustration, a pair of wheels are indicated by the blocks 20, each wheel including a motor 40 and a gear train 85 for driving the respective wheel, the two wheels being utilized, for example, as front wheel assist for a conventional tractor or the like. The governor for each motor is indicated at 80 and the check valves controlling supply of fluid to the governor are indicated at 75. The fluid supply lines to corresponding ports of the two motors are indicated respectively at 45a and 45b, and the drain or return lines for the fluid used as wheel lubricant are indicated at 81.

The fluid for the system is supplied from a reservoir 100 including an oil or fluid filter 101 whereby clean oil may be re-circulated through the system. The lines 81 suitably return directly to the reservoir.

The reservoir primarily supplies fluid to a main pump 102 which is driven by the prime mover of the vehicle, suitably through a gear reduction 103 including a manually operated clutch 104 or like means for selectively driving or disengaging the pump. In the preferred embodiment, the tractor prime mover also drives a supercharger 105 and a control pump 106.

The control pump 106 draws fluid from the reservoir 100 via conduit 107 and pumps the same at a relatively low control pressure via conduit 108 to a pressure regulator 109. The regulator 109 is manually adjustable, as by means of a handle or knob 110, thereby to cause increase or decrease in the control pressure and by virtue thereof to increase and decrease the speed of the motor, as will presently be described. The fluid at the regulated control pressure flows via line 111 to a four-way reversing valve 112 including a central, neutral position, in which the valve is illustrated in FIGURE 8, a forward position and a reverse position. In the neutral position, the valve includes ports 113 which are interconnected whereby the entire control system is at the same pressure and thus neutralized. In the forward position, the same includes a pair of parallel ports 114 one of which serves to connect line 111 to a forward control line 115 and the other of which connects a reverse control line 116 with a vent or return line 117 returning to the reservoir 100. In its reverse position, the valve 112 has ports 118 reversing the connections effected in the forward position, i.e., connecting the line 111 to the reverse control line 116 and connecting the forward control line 115 to the return line 117.

The valve 112 may be operated manually, and is operable independently of the pressure regulator 109. In the preferred installation, the valve 112 is connected to or otherwise arranged to be operated at least in part by the shift means of the vehicle's power transmission so that the wheels 20 will operate in the same direction as the main drive wheels of the tractor, or at least will not oppose the latter. In FIGURE 8, I have shown the reversing valve 112 operatively connected to the transmission shift means of the vehicle, as indicated schematically at 119.

Assuming the valve 112 is in forward position, control fluid at a regulated or adjusted pressure is fed via line 111 and ports 114 to the forward control line 115. At the same time, the line 116 is vented to the reservoir. Fluid in the line 115 is fed to a hydraulic actuator 115a for a four-way valve 120 and to a main pump direction controlling and output adjusting stroke cylinder 115b. The cylinder 115b operates in known manner to cause the pump to operate in one direction, i.e., to pump fluid in one direction, and also operates upon increase and decrease in the control pressure to increase and decrease the output pressure of the pump 102.

The valve 120 is normally centered in a neutral position by centering springs 121, and the same in said position includes interconnected ports 122 serving to put the system all at the same pressure thereby to neutralize the system. Upon actuation by the actuator 115a, the valve is shifted to a forward position wherein a pair of paralled ports 123 are brought into effective operation. Due to actuation of the stroke cylinder 115b, the pump is at this time operating to supply fluid under pressure via supply line or conduit 145a to the ports 45a of the motors 40 to cause the wheels 20 to rotate in forward direction. At the same time, ports 45b of the motors 40 are coupled to conduit 145b which at this time is connected to the pump inlet, whereby fluid is circulated from the pump 102 via line 145a to ports 45a of the motors 40 and then back to the pump via ports 45b and lines 145b.

The conduit 145a is also coupled to a conduit 146a which leads back to the valve 120 and which at this time is coupled via the ports 123 to a conduit 124 which leads to the pressure regulator 109, whereby full system pressure is brought to bear on the regulator to the extent that if system pressure exceeds a predetermined maximum the regulator will be opened or by-passed or vented, in known manners, to relieve or decrease control pressure, whereby the stroke cylinder 115b will be automatically adjusted to decrease the output pressure of the pump and thereby afford an automatic safety against excessive system pressures.

The conduit 145b is similarly coupled to a conduit 146b which leads to the valve 120 and which at this time is coupled by the other port 123 to the super-charger 105 to afford an initially pressurized supply of fluid to the pump 102.

When it is desired to reverse the direction of the rotation of the wheels 20, it is only necessary to operate the reversing valve 112 to its reverse position, whereupon control fluid is supplied via reverse line 116 to a hydraulic actuator 116a for the valve 120 and a second pump direction and stroke adjusting cylinder 116b. At the same time, the actuator 115a and cylinder 115b are vented to the reservoir via line 117, whereupon the actuator 116a may shift valve 120 to reverse position and the cylinder 116b may take over control of the motor. Fluid under pressure is then supplied from pump 102 via conduit 145b and ports 45b to the motors 40 to drive the wheels in reverse direction, the fluid being returned to the pump via ports 45a and conduit 145a. At the same time, the valve 120 has been shifted so that system pressure is transmitted to the regulator 109 via conduit 146b, reversing ports 125 in the valve 120 and the conduit 124; and the conduit 146b is connected to the supercharger 105.

In tractors and other vehicles embodying an automatic transmission, the control 119 suffices for correlation of the vehicle drve wheel controls and the controls for the power wheels of this invention. However, in those vehicles having manual shift and a clutch in the transmission means thereof, it is preferable to embody means in the control system for de-activating the power wheels when the clutch is disenaged and it is intended to stop the transmission of power. Specifically, as indicated diagrammatically in FIGURE 8, the vehicle clutch pedal 126 may have associated therewith a valve 127 having ports 128 constituting portions of the conduits 145a and 145b when the clutch is engaged, and having ports 129 for interconnecting the conduits 145a and 145b when the clutch is disengaged, whereby the entire pressure system is equalized at the same pressure and thus effectively neutralized until the clutch is again engaged.

The control system thus provides for fully controlled, safe operation of the pump and motors to drive the wheels 20 in reverse direction in accordance with the drive of the rear wheels of the vehicle to afford a power assist for the rear wheels whenever that is desired. Among the many advantages of such power assist are added tractraction, better steering, shorter turning radius without skidding, and automatic compensation for vehicle drive speeds through the full speed range, forward and reverse. Due to the neutral positions established by the valves, and the clutch means 104, the power wheels 20 may be disengaged at any time, whereupon the same are free wheeling and do not interfere with the conventional or normal operation of the vehicle.

Figure 9:
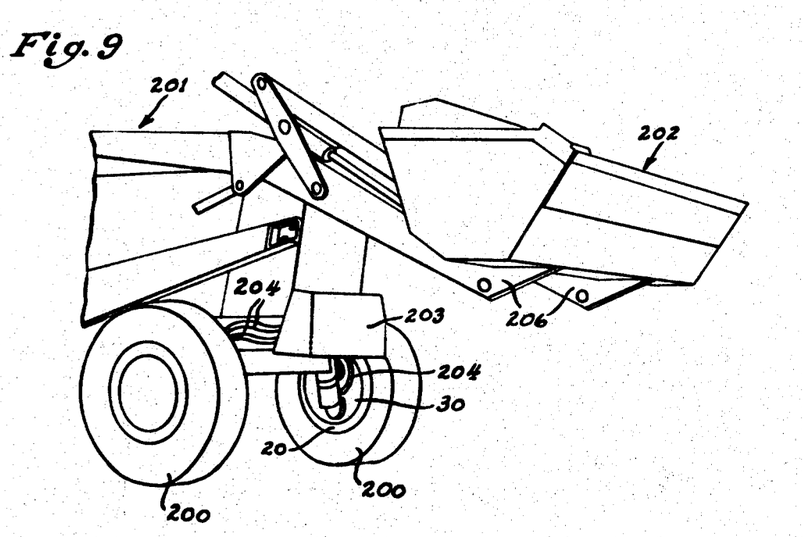
FIGURE 9 is a fragmentary perspective view of a tractor with a front end loader showing the application of my power wheels thereto.

Due to the fact that the wheels are completely self-contained, they may be mounted on substantially any vehicle having substantially any wheel mount or suspension and the same will not interfere with or detract from the normal capabilities or advantages of the vehicle or the wheel mounting means thereof. For example, in FIGURE 9, I have shown my power wheels installed as the front wheels 200 of a tractor 201 equipped with a front end loader 202. In this tractor, the front wheels are mounted by spindles and pads similar to those indicated at 26, 27, 28 and 31 in FIGURE 1. The fluid supply and control system is conveniently mounted at the front of the tractor, as indicated at 203, where the pumps 102, 105 and 106 may be readily connected to a power take-off point on the tractor motor. Flexible hoses 204 run from the unit 203 to the wheel mounts to form the conduits previously identified by the numerals 45, 81 and 145. Due to this flexibility, the hoses facilitate turning of the wheels. As will be observed, none of the apparatus provided by this invention in any way interferes with or obstructs the tractor, the wheel mounts, the loader 202 or the supporting and operating arms 205 for the loader.

Figure 10:
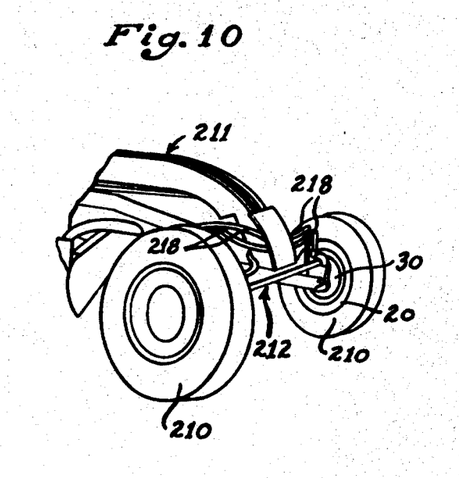
FIGURE 10 is a fragmentary perspective view of a motor grader having tiltable front wheels and showing the application of my power wheels thereto.
Figure 11:
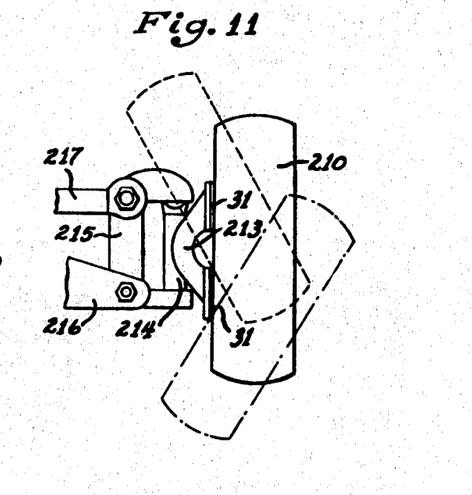
FIGURE 11 is a front elevation of one of the front power wheels of the motor grader depicting the tiltability of such wheels.

In FIGURES 10 and 11, I have shown a pair of my power wheels applied as the front wheels 210 of a motor grader 211 including means 212 for tilting the wheels to adjust the side draft thereof. In this structure, a wishbone 213 secured to the wheel mounting pads 31 is formed integrally with the spindle 214 of the wheel mount. This spindle in turn is pivotally mounted in a U-shaped tilt bracket 215 which is pivotally mounted on the grader axle 216 and adpated to be tilted relative to the axle by cross bar means 217 extending between the brackets 215 mounting the two front wheels. The two wheels are swingable about the axes of their respective spindles by steering tie rod means connected in conventional manner to the spindles 214. Flexible hoses 218 extend from the power unit (which is mounted in any suitable manner on the grader) to each wheel to form the conduit means 45, 81 and 145. Due to the flexibility of the hoses, and the fact that the wheels are entirely self-contained, the wheels may be tilted and turned in the same manner as usual without any interference, as is illustrated in FIGURE 11.

The invention thus affords front wheel drive for substantially any wheeled vehicle substantially irrespective of the capabilities and structural details of the vehicle, the wheel mounts and auxiliary equipment associated with the vehicle; and does so in a convenient, economical and practical manner.

While I have shown and described what I regard to be the preferred embodiment of my invention, it is to be appreciated that various changes, rearrangements and modifications may be made therein without departing from the scope of the invention, as defined by the appended claims.

I claim:

1. A self-contained power driven vehicle wheel comprising a wheel rim of standard size for reception of a standard vehicle tire, a ring gear on the radially inner surface of said rim, a cylindrical plug assembly inserted within said rim and confined substantially entirely within the interior of said rim, means journalling said rim on said plug assembly, said assembly containing therein and supporting a fluid pressure operated motor, said motor including a rotary cylinder block having a drive gear on the periphery thereof, and a gear train coupled to said drive gear and said ring gear for transmitting rotation of said cylinder block to said rim, fluid inlet means for the motor on an exposed end surface of said assembly, and wheel mounting means on an exposed end surface of said assembly.

2. A wheel as set forth in claim 1, said assembly comprising a cylinder inserted in said rim adjacent one side thereof and having an outer wall constituting said exposed end surfaces of said assembly, said motor and said gears projecting from the inner wall of said cylinder further into the interior of said rim.

3. A wheel as set forth in claim 2, said means journalling said rim on said assembly comprising a bearing race on the radially inner surface of said rim adjacent said one side thereof, a complemental and aligned bearing race on the radially outer surface of said cylinder, and an annular series of bearing balls riding in said races, said balls retaining said rim on said cylinder.

4. A wheel as set forth in claim 1, said motor comprising a housing supported on said assembly, a guide shaft in said housing said cylinder block journalled on said guide shaft and having a plurality of axially extending cylinders in a circular array about said shaft, a piston reciprocable in each cylinder, a guide plate in said housing at one end of said block engageable by said pistons for governing the reciprocation of said pistons, and a pair of fluid supply means subtending respective arcuate areas of said circular array of cylinders at the opposite end of said block, said housing having an apertured wall exposing said gear and accommodating engagement thereof with said gear train.

5. A fluid pressure operated motor comprising a housing, a guide shaft in said housing, a cylinder block journalled on said guide shaft and having a plurality of axially extending cylinders in a circular array about said shaft, a piston reciprocal in each cylinder, a guide plate in said housing at one end of said block engageable by said pistons for governing the reciprocation of said pistons, a pair of fluid supply means subtending respective arcuate areas of said circular array of cylinders at the opposite end of said block, said housing having an opening in the wall thereof exposing the peripheral surface of said block, and power transmitting means on the exposed peripheral surface of said block.

6. A fluid pressure operated motor comprising a housing a guide shaft in said housing, a cylinder block journalled on said guide shaft and having a plurality of axially extending cylinders in a circular array about said shaft, a piston reciprocal in each cylinder, a guide plate in said housing at one end of said block engageable by said pistons for governing the reciprocation of said pistons, a pair of fluid supply means subtending respective arcuate areas of said circular array of cylinders at the opposite end of said block, power output means on the periphery of said block, said guide plate being pivotally mounted in said housing on an axis transverse to said guide shaft and being adjustable about said axis to vary the stroke of said pistons, means coupled to said fluid supply means and operatively connected to said guide plate for adjusting said plate in proportion to the pressure of the fluid supplied to said motor, and an extension on said guide plate extending through an opening in said housing, said opening and said extension comprising means limiting movement of said guide plate.

7. A fluid pressure operated motor comprising a housing, a guide shaft in said housing, a cylinder block journalled on said guide shaft and having a plurality of axially extending cylinders in a circular array about said shaft, a piston reciprocable in each cylinder, a guide plate in said housing at one end of said block engageable by said pistons for governing the reciprocation of said pistons, a pair of fluid supply means subtending respective arcuate areas of said circular array of cylinders at the opposite end of said block, power output means on the periphery of said block, said guide plate being pivotally mounted in said housing on an axis transverse to said guide shaft, bearing surfaces in said housing supporting said plate on said axis, said shaft having a spherical head the center of which is substantially coincident with said axis, said plate having a swivel mount on said head and carrying thrust from said shaft and the pistons to said bearing surfaces.

8. A control system for a fluid pressure operated motor comprising a reversible pump having two fluid lines extending to the motor for reversible supply to the motor of fluid under pressure, control means governing pump operation, means for selectively supplying fluid under pressure to said control means for operating the same to govern the direction of pump operation, and means for governing the pressure of the fluid supplied to said control means for operating the same to govern the degree of pump operation, said pressure governing means including a pressure regulator coupled to the output of said pump and override means coupling the output of said pressure regulator to said control means for regulating the degree of pump operation when the output pressure of the pump exceeds a predetermined pressure.

9. A control system as set forth in claim 12, said control means comprising a pair of pump direction governing and pump output adjusting cylinder means, said fluid supplying means including a reversing valve for supplying fluid selectively to said cylinder means, said pressure regulator being adjustable for controlling the pressure of the fluid supply to said cylinder means.

10. A control system as set forth in claim 9, said reversing valve and said pressure regulator comprising independent manually adjustable elements for manually governing the direction, speed and power of the motor.

11. In a wheeled vehicle having a prime mover, means for driving the vehicle comprising a self-contained power driven wheel including a wheel rim of standard size for reception of a standard vehicle tire, a ring gear on the radially inner surface of said rim, a cylindrical plug assembly inserted within said rim and confined substantially entirely within the interior of said rim, means journalling said rim on said plug assembly, said assembly containing therein and supporting a fluid pressure operated motor including a rotary cylinder block having an output gear on the periphery thereof and a gear train coupled to said output gear and said ring gear for transmitting power from said block to said rim, a pair of fluid supply means for the motor on an exposed end surface of said assembly, and mounting means on an exposed end surface of said assembly for mounting the wheel on the vehicle; a reversible pump driven by the prime mover of the vehicle, said pump having two fluid lines extending respectively to the fluid supply means of the motor for reversible supply to the motor of fluid under pressure, control means governing pump operation, means for selectively supplying fluid under pressure to said control means for operating the same to govern the direction of pump operation, means for governing the pressure of the fluid supplied to said control means for operating the same to govern the degree of pump operation, and means on the vehicle manually operable by the operator for controlling said selective supply means and said pressure governing means to control the operation of said wheel, said pressure governing means including override means coupled to the output of said pump for regulating the degree of pump operation when the output pressure of the pump exceeds a predetermined pressure.

12. In a vehicle as set forth in claim 11, said prime mover being coupled to other wheels of said vehicle and including power transmission means for engaging and disengaging said prime mover and said other wheels and for reversing the direction of drive of said other wheels by said prime mover; said power transmission means including manually operable means for engaging, disengaging and reversing said transmission means, said fluid supplying means including means coupled to the latter manually operated means for supplying, not supplying and reversing the direction of supply of fluid to said control means for governing said power driven wheel simultaneously with said other wheels.

13. In a vehicle as set forth in claim 11, the vehicle comprising a tractor with a front end loader and the power wheels comprising the front wheels of the tractor, said wheels being self contained and clear of the loader.

14. In a vehicle as set forth in claim 11, the vehicle comprising a motor grader or the like having tiltable and steerable front wheel mounts, the power wheels comprising said front wheels and being self contained and clear of the mounts to prevent interference with the tilting and steering movements thereof.

15. A self-contained power driven vehicle wheel comprising a wheel rim of standard size for reception of a standard vehicle tire, a ring gear on the radially inner surface of said rim, a cylindrical plug assembly inserted within said rim and confined substantially entirely within the interior of said rim, means journalling said rim on said plug assembly, said assembly containing therein and supporting a fluid pressure operated motor, said motor being confined within said rim and having an apertured wall within the interior of the rim exposing an intermediate portion of the output member thereof, an output gear on said intermediate portion of said output member, and a gear train meshed through said apertured wall with said output gear and with said ring gear for transmitting rotation of said output gear to said rim, fluid inlet means for the motor on an exposed end surface of said assembly, and wheel mounting means on an exposed end surface of said assembly.

16. In a fluid power wheel to be substituted for a conventional wheel on a conventional vehicle, the wheel comprising rim and a tire on the rim and having a fluid pressure operated motor and a drive train mounted within the rim, said train establishing a drive connection between the motor and said rim, the improvement comprising means mounting the motor and the drive train within the wheel to the exterior of the interior face of the rim, said means including a generally planar face member adjacent the interior face of the rim and having an inner face facing toward the wheel center line and an outer face facing away from the wheel center line and spindle mounting means on the outer face of said member, said motor and said drive train being mounted on the inner face of said generally planar face member, and a spindle the same as the conventional spindle of the vehicle mounted on said spindle mounting means, whereby the fluid power wheel may be mounted on the vehicle in accordance with the conventional wheel mounting of the vehicle without changing the wheel size, tread width or steering connections of the vehicle, and without interfering with or obstructing any components or accessory attachments on the vehicle.

17. In a fluid power wheel as set forth in claim 16 to be substituted for a front wheel of a motor grader having means for supporting the spindle of such wheel for steering movements and for tilting movements, the spindle of the fluid power wheel being the same as the spindle of the conventional wheel and having the same mounting on said supporting means without interfering with or detracting from said wheel steering and tilting movements.

References Cited
UNITED STATES PATENTS

| | | | |
|---|---|---|---|
| 432,359 | 7/1890 | Berry | 91—198 |
| 2,258,328 | 10/1941 | Lee et al. | 180—10 X |
| 2,340,169 | 1/1944 | Arndt | 91—198 X |
| 2,357,742 | 9/1944 | Jeffry | 180—66 X |
| 2,430,528 | 11/1947 | Moon | 180—66 X |
| 2,667,862 | 2/1954 | Muller | 91—199 |
| 3,124,079 | 3/1964 | Boyer | 103—162 |
| 3,192,868 | 7/1965 | Wahlmark | 103—162 |
| 3,272,277 | 9/1966 | Budzich | 180—66 X |
| 3,303,901 | 2/1967 | Schou | 180—66 X |

FOREIGN PATENTS

| | | |
|---|---|---|
| 791,903 | 3/1958 | Great Britain. |
| 836,690 | 6/1960 | Great Britain. |
| 939,079 | 10/1963 | Great Britain. |

BENJAMIN HERSH, *Primary Examiner.*

MILTON L. SMITH, *Examiner.*

UNITED STATES PATENT OFFICE
CERTIFICATE OF CORRECTION

Patent No. 3,391,753                                  July 9, 1968

Arthur F. Anderson

It is certified that error appears in the above identified patent and that said Letters Patent are hereby corrected as shown below:

In the heading to the printed specification, lines 4 and 5, "Ulrich Hydraulics, Inc., Roanoke, Ill., a corporation of Delaware" should read -- Ulrich Manufacturing Co., Roanoke, Ill., a corporation of Delaware --.

Signed and sealed this 18th day of November 1969.

(SEAL)
Attest:

Edward M. Fletcher, Jr.                      WILLIAM E. SCHUYLER, JR.
Attesting Officer                                Commissioner of Patents